(12) United States Patent
Knappe et al.

(10) Patent No.: US 6,755,970 B1
(45) Date of Patent: Jun. 29, 2004

(54) BACK-FLUSHABLE SPIRAL WOUND FILTER AND METHODS OF MAKING AND USING SAME

(75) Inventors: Peter H. Knappe, Santa Barbara, CA (US); Seymour S. Kremen, Coronado, CA (US); Hans A. Thomason, Lloret de Mar (ES); Matthew B. Tanner, Ventura, CA (US)

(73) Assignee: TriSep Corporation, Goleta, CA (US)

( * ) Notice: Subject to any disclaimer, the term of this patent is extended or adjusted under 35 U.S.C. 154(b) by 0 days.

(21) Appl. No.: 10/018,923

(22) PCT Filed: Jun. 22, 1999

(86) PCT No.: PCT/US99/13934

§ 371 (c)(1),
(2), (4) Date: Mar. 20, 2002

(87) PCT Pub. No.: WO00/78436

PCT Pub. Date: Dec. 28, 2000

(51) Int. Cl.$^7$ ............................................. B01D 65/02
(52) U.S. Cl. ........................ 210/321.69; 210/321.74; 210/321.83; 210/427
(58) Field of Search ............................ 366/165.1, 336, 366/338, 340, 341, 348; 137/1, 803, 806, 808, 833; 428/166, 168, 172; 210/321.69, 321.74, 321.76, 321.83, 321.85, 411, 412, 413, 424, 425, 426, 427, 636, 650, 791, 797; 96/4, 11

(56) References Cited

U.S. PATENT DOCUMENTS 3,386,583 A 6/1968 Merten (List continued on next page.)

FOREIGN PATENT DOCUMENTS

| EP | 0 581 544 A2 | 2/1994 |
|----|--------------|--------|
| EP | 0 584 411 A1 | 3/1994 |
| EP | 0 669 159 A1 | 8/1995 |
| JP | 10235164 A | 9/1998 |
| WO | WO 95/32041 | 11/1995 |

OTHER PUBLICATIONS

Koch advertisement, ULTRAPURE WATER, May/Jun. 1998.

(List continued on next page.)

*Primary Examiner*—Joseph Drodge
(74) *Attorney, Agent, or Firm*—Fitch, Even, Tabin & Flannery

(57) ABSTRACT

A spiral wound membrane filtration element capable of being back-flushed has a permeate carrier sheet; a permeable membrane filter layer sheet adhesively bonded to the permeate carrier sheet, and a feed spacer sheet. The membrane filter layer sheet folds over the feed spacer so that the feed spacer sheet is sandwiched between two layers of the membrane filter layer sheet. The sandwich positions over the permeate carrier sheet such that the adhesive seal bonds the membrane filter layer sheet to the permeate carrier sheet. The permeate carrier sheet, the membrane filter layer sheet, and the feed spacer sheet are wrapped around a permeate collection tube. The filter element is cleaned by pressurizing the feed solution or by creating a vacuum in the permeate collection tube, and periodically introducing a pressurized back flush fluid into the permeate collection tube of the filtration element to back-flush the membrane, under a pressure and for a time sufficient to dislodge a substantial portion of the retained solids on the surface of the membrane. The membrane filter layer sheet is made by placing a casting a casting solution of a certain thickness on a passing support substrate having a Frazier air permeability between 0.1 and 10 cfm/ft$^2$. The thickness of the casting solution on the support substrate is controlled through use of a mechanical device for dispersing the casting solution. The substrate with the casting solution is then immersed into a quench bath, to allow removal of casting solution, after an air quench time that allows formation of a thin membrane film on the support substrate.

25 Claims, 6 Drawing Sheets

U.S. PATENT DOCUMENTS

| | | | |
|---|---|---|---|
| 3,417,870 A | * 12/1968 | Bray | 210/636 |
| 3,813,334 A | 5/1974 | Bray | |
| 3,912,624 A | 10/1975 | Jennings | |
| 3,933,646 A | 1/1976 | Kanamaru et al. | |
| 3,966,616 A | 6/1976 | Bray | |
| 4,548,714 A | 10/1985 | Kirwan, Jr. et al. | |
| 4,668,384 A | 5/1987 | Holman | |
| 4,687,522 A | 8/1987 | Hayashi et al. | |
| 4,767,539 A | 8/1988 | Ford | |
| 4,816,160 A | * 3/1989 | Ford et al. | 210/636 |
| 4,834,881 A | 5/1989 | Sawada et al. | |
| 4,872,990 A | 10/1989 | Van Wijk | |
| 4,980,066 A | * 12/1990 | Slegers | 210/636 |
| 4,986,918 A | * 1/1991 | Breslau et al. | 210/652 |
| 5,069,793 A | 12/1991 | Kaschemekat et al. | |
| 5,171,767 A | * 12/1992 | Buckley et al. | 523/310 |
| 5,236,643 A | 8/1993 | Tseng et al. | |
| 5,275,726 A | * 1/1994 | Feimer et al. | 210/321.74 |
| 5,290,446 A | 3/1994 | Degen et al. | |
| 5,352,362 A | * 10/1994 | Mizutani et al. | 210/650 |
| 5,576,057 A | 11/1996 | Hirose et al. | |
| 5,614,099 A | 3/1997 | Hirose et al. | |
| 5,639,373 A | 6/1997 | Mahendran et al. | |
| 5,674,398 A | 10/1997 | Hirose et al. | |
| 5,690,830 A | 11/1997 | Ohtani et al. | |
| 5,733,602 A | 3/1998 | Hirose et al. | |
| 5,744,039 A | 4/1998 | Itoh et al. | |
| 5,843,351 A | 12/1998 | Hirose et al. | |
| 5,888,605 A | 3/1999 | Hachisuka et al. | |
| 5,910,357 A | 6/1999 | Hachisuka et al. | |
| 5,944,997 A | * 8/1999 | Pedersen et al. | 210/636 |
| 6,120,688 A | 9/2000 | Daly et al. | 210/650 |
| 6,186,660 B1 | * 2/2001 | Kopf-Sill et al. | 366/340 |
| 6,190,557 B1 | 2/2001 | Hisada et al. | |
| 6,655,829 B1 | * 12/2003 | Vanden Bussche et al. | 366/165.1 |

OTHER PUBLICATIONS

Koch Membrane Systems, Inc. Article—"RomiPure Ultrafiltration"—The Solution for Effective RO Pretreatment, KPN 0679197, 2 pgs., Pub daye unknown.

Iwahori, et al., "An Effective Method of Water Treatment with a Novel Back–washable Spiral–wound UF Module", pub. San Diego Proceedings, 1999, 12 pages.

* cited by examiner

BACK-FLUSHABLE SPIRAL WOUND FILTER AND METHODS OF MAKING AND USING SAME

CROSS-REFERENCE TO RELATED APPLICATIONS

This application is a 371 application with respect to PCT Patent Application No. PCT/US99/13934, filed on Jun. 22, 1999.

BACKGROUND OF THE INVENTION

Membrane fouling is generally recognized as the outstanding problem in modern membrane separations. A full discussion of the problems, specifically associated with ultrafiltration, can be found in "Fifteen Years of Ultrafiltration" by Micheals, A. S. in Ultrafiltration Membranes and Applications edited by A R. Cooper (American Chemical Society Symposium, Washington, 9–14 Sep. 1979, Plenum Press, New York (1980); ISBN 0-306-40548-2) where it is stated that "the problems of reduced throughput, capacity, increased power consumption, compromised separation capability, and reduced membrane service lifetime associated with macro, solute- and colloid-fouling of ultrafiltration membranes have stubbornly resisted adequate solution despite ten years of engineering experience in pilot and full-scale industrial situations."

According to Micheals, back-flushing by reverse flow of permeate in hollow-fiber membrane modules, significantly aids in unplugging of membrane pores and detachment of adhering deposits. However, there are only two specific examples of permeate back-flushing described in that text and these concern filtration of tap water and of electrodeposition paints emulsified in water.

As set forth at pages 109 to 227 of the above text, back-flushing of hollow fibers with permeate is used where operating transmembrane pressures are only about one atmosphere so that particles are not driven hard into membrane pores during the filtering process. As indicated above, permeate back-flushing has been used where the fouling species are in liquid paint emulsion droplets as these species do not wedge into the membrane pores as do solids. As the transmembrane flux is often only five to twenty liters per square meter per hour (L/m$^2$ hr), the corresponding fluid velocity is only a few millimeters per hour and there is, therefore, no possibility of a high velocity cleaning action.

Permeate back-flushing is, in essence, a recycling process and, thus, a sacrifice of production rate is only justified when the cleaning effect is significant. Some sticky natural wastes (such as brewing residues, starch, and egg) are not removed to any appreciable extent by permeate back-flushing According to Micheals, permeate back-flushing is, by definition, a purely hydraulic flow through totally wetted pores of the ultrafiltration membrane.

In U.S. Pat. No. 4,767,539, Ford describes an improved method of back-flushing hollow fiber filters which uses a gas back-flush medium. Ford's invention uses the back-flush gas at a pressure of about 500 kilopascals to swell the fiber from the inside and erupt around the elastic openings. This gas back-flush resulted in better removal of foulants from the surface of the membrane than did the standard permeate back-flush. The penetration of gas into the pores of a membrane is resisted by the sure tension forces of the contained wall-wetting liquid. Indeed, surface tension is conveniently measured by the breakthrough pressure needed to force a bubble out of a submerged orifice. For common systems (such as oil in hydrophobic pores or water in hydrophilic pores) the breakthrough pressure required ranges from ten kilopascals to a thousand kilopascals. The breakthrough pressures are much higher than the usual operating pressures of the filter.

In U.S. Pat. No. 5,248,424, Cote describes a frame-less array of hollow fiber membranes and a method of maintaining a clean fiber surface while filtering a substrate and withdrawing permeate. A scrubbing gas is used to sway the free floating fibers and thus minimizes or eliminates the build-up of foulants and biological organisms on the membrane surface.

Historically, difficult feed solutions with high organic and suspended solids have been treated with capillary (0.3–1.0 mm dia) or tubular element designs. While these designs are effective, they have a number of limitations, notably, the materials of construction must be chosen not just for the permeability and rejection characteristics needed to perform separations, but also for mechanical strength to withstand the feed pressures required for operation, including back-flush. The hollow fiber and tubular constructions also have relatively low packing densities of active membrane area, thus the cost per unit area is high.

All of the above-mentioned devices are manufactured in a hollow fiber configuration. While this design has many advantages, it is not as versatile and cost effective as spiral wound membrane designs. Spiral wound membrane filtration elements with microfiltration (MF), ultrafiltration (UF), nanofiltration (NF), and reverse osmosis (RO) membranes, are used for treating drinking or process water that is relatively low in suspended solids and organic foulants.

Increasingly, more and more difficult feed solutions are being treated with spiral wound elements. Spiral wound elements have several advantages over hollow fiber and tubular elements. The membranes are cast on a woven or non-woven support substrate which lends structural strength and allows easy membrane formation. Support fabric substrates allow membranes to be formed as composites, with the base membrane providing a strong and defect free support sure over which can be coated a thin barrier layer that dictates the transport properties. Also, the spiral wound configuration has a high packing density, has a low production cost, is easily scaled up to large systems, and replacement is easy and inexpensive. In most current commercial applications using UF, NF, or RO where spiral elements can operate effectively, they have become the design of choice due to the above mentioned benefits.

However, most spiral wound elements can not be back-flushed due to failure of the adhesive seals and delimitation of the membrane film from the support fabric substrate. A recent survey of warranty literature from manufacturers of the large majority of spiral wound element filters all contain strong, unequivocal language reaffirming that any back pressure would damage the elements and are conclusive grounds for voiding the membrane element warranty. A design for spiral wound elements that would allow for effective back-flushing is needed.

SUMMARY OF THE INVENTION

It is an object of this invention to provide a spiral wound membrane and element configuration capable of being back-flushed, and an improved method of processing and back-flushing fluids using spiral wound membrane elements.

A spiral wound membrane filtration element capable of being back-flushed has a permeate carrier sheet, a membrane filter layer sheet adhesively bonded to the permeate carrier sheet, and a feed spacer sheet in between layers of membrane filter layer sheets. The membrane filter layer sheet is normally folded in half, over a feed spacer sheet. An active membrane film side of the membrane filter layer sheet faces both sides of the feed spacer. The feed spacer sheet, the membrane filter layer sheets, and the permeate carrier sheet are wrapped around a permeate collection tube.

The membrane filter layer sheet further has a support substrate with a Frazier air permeability between 1 and 10 cfm/ft$^2$. The membrane filter layer sheet may be homogenous or asymmetric. For a homogenous membrane filter layer sheet, polymeric film may be encased around a support substrate or be a self-supporting polymeric film. In an asymmetric membrane filter layer sheet, the polymer film is cast on top of a support substrate, and adequately bonded thereto in order to eliminate delamination during a back-flush cycle.

The permeate carrier fabric sheet acts as a conduit that allows the part of the feed solution which permeates the membrane filter layer sheet to exit the element via the permeate collection tube which is in the center of the element. Each membrane filter layer sheet is bonded to the permeate carrier fabric sheet on the three sides not adjacent to the permeate collection tube with an adhesive capable of retaining the seal throughout a back-flushing of the element.

A method of making a back-flushable spiral wound membrane filtration element comprises forming a membrane filter layer sheet, cutting the membrane filter layer sheet to a desired length, placing a cut piece of a feed spacer sheet on top of the membrane filter layer sheet, the width of the feed spacer sheet being approximately half the width of the membrane filter layer sheet; folding the membrane filter layer sheet over the feed spacer so that the feed spacer sheet is sandwiched between two layers of the membrane filter layer sheet; attaching a center side part of a permeate carrier sheet to the permeate collection tube; applying an adhesive seal on the permeate carrier sheet along sides other than the center side part; positioning the membrane filter layer sheet-feed spacer sheet sandwich over the permeate carrier sheet such that the adhesive seal bonds the membrane filter layer sheet to the permeate carrier sheet; and wrapping the permeate carrier sheet, the membrane filter layer sheet, and the feed spacer sheet around the permeate collection tube.

A method of creating a permeable membrane filter layer sheet comprising placing a casting solution of a rain thickness on a passing support substrate; controlling the thickness of the casting solution on the support substrate through use of a mechanical device for dispensing the casting solution; and immersing the substrate with the casting solution into a quench bath to allow removal of casting solution after an air quench time that allows formation of a thin skin on the support substrate.

A preferred back-flush system for the back-flushable spiral wound membrane filtration element comprises a feed solution for the filtration element from a source; a pump suction pipe having a shut off valve, the pump suction pipe used in withdrawal of the feed solution; a feed pump for pumping and pressurizing the feed solution from the source through the filtration element; a feed valve for controlling the pump discharge pressure; a feed pressure gauge for measuring the feed pressure from the pump; a feed pipe through which the pressurized feed solution flows to the element; an element pressure tube wherein a first portion of the feed solution permeates the membrane filtration element as a permeate, and a second portion of the feed solution does not permeate and exits the membrane filtration element as a concentrate; a feed diverter valve for controlling flow from the feed pipe to the pressure tube; a gas tank having a gas regulator and compressed gas capable of back-flushing the membrane filtration element; a concentrate diverter valve for controlling the flow rate of concentrate out of the exiting pressure tube; a concentrate valve for controlling the flow rate of concentrate out of the concentrate diverter valve; a concentrate flow meter for measuring the concentrate flow out of the concentrate valve; a permeate accumulator capable of holding permeate for the back-flush step; a permeate diverter valve for controlling the flow rate of permeate out of the permeate accumulator and for controlling the flow rate of gas out of the tank while back-flushing; and a permeate flow meter for measuring permeate flow out of the permeate diverter valve.

Another preferred method of back-flushing the spiral wound membrane filtration element through the back-flush system comprises gathering feed solution for the filtration element from a source; withdrawing feed solution from the source through a pump suction pipe having a shut off valve; pumping the feed solution from the source using a feed pump; pressurizing the feed solution in the pump; pumping the pressed feed solution through the filtration element using the feed pump; controlling the pump discharge pressure using a feed valve; measuring the feed pressure from the pump using a feed pressure gauge; controlling flow from a feed pipe to the element using a feed diverter valve; permeating the membrane filtration element with a portion of the feed solution as a permeate; allowing a second portion of the feed solution which does not permeate the membrane filtration element to pass through the membrane filtration element as a concentrate; pressurizing back flush fluid in a gas tank used for back-flushing the membrane filtration element; controlling the flow rate of concentrate out of the element using a concentrate diverter valve; controlling the flow rate of concentrate out of the concentrate diverter valve using a concentrate valve; measuring the concentrate flow out of the concentrate valve using a concentrate flow meter; holding permeate for the back-flush step using a permeate accumulator; controlling the flow rate of permeate out of the permeate accumulator and the flow rate of gas out of the tank while back-flushing using a permeate diverter valve; measuring permeate flow out of the permeate diverter valve using a permeate flow meter; and cleaning the spiral wound membrane filtration element having a membrane with pores through back-flushing the element.

Methods of cleaning a spiral wound membrane filtration element and system useful for filtering feed solution are carried out by pressurizing the feed solution or by creating a vacuum in the permeate collection tube, and periodically introducing a pressurized back flush fluid into the permeate collection tube of the filtration element to back-flush the membrane, under a pressure and for a time sufficient to dislodge a substantial portion of the retained solids on the surface of the membrane.

DETAILED DESCRIPTION OF THE PREFERRED EMBODIMENTS

Figure 1:
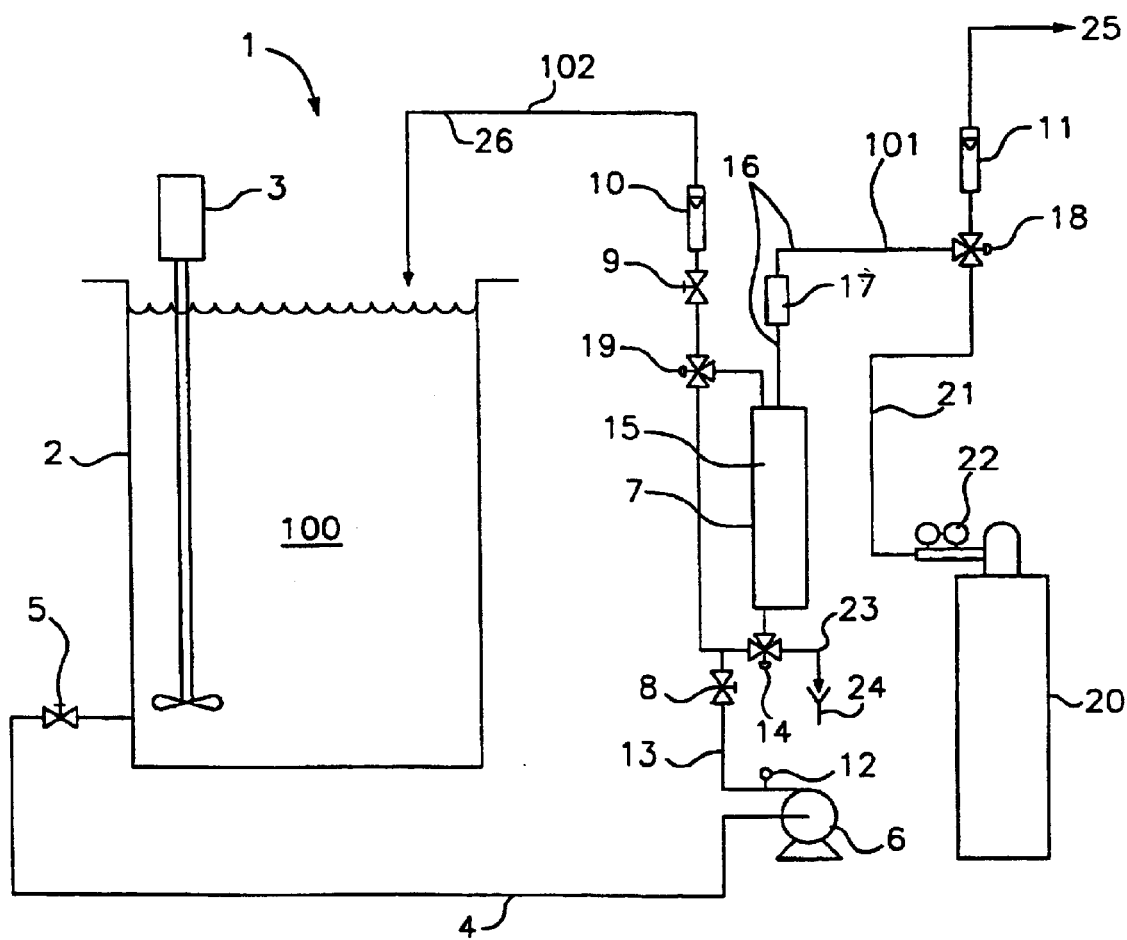
FIG. 1 shows a spiral wound element back-flush system employing a single element pressure tube mounted in a vertical position.

A first preferred embodiment of the present invention is shown in FIG. 1. A spiral element back-flush system 1 has a feed tank 2, a feed pump 6, an element pressure tube 7, and a compressed gas tank 20. Element pressure tube 7 is preferably mounted in a vertical position. Feed tank 2 contains a feed solution 100. Feed tank 2 can be replaced by a pipe from a process stream in practical applications. In this embodiment, an electric mixer 3 is shown that is used to keep the feed tank well mixed. Mixer 3 may or may not be required for commercial applications depending on the feed solution. Feed solution 100 is withdrawn from tank 2 via a pump suction pipe 4 to feed pump 6. Feed pump 6 pumps feed solution 100 through element pressure tube 7 via a feed pipe 13.

Feed solution 100 then enters element pressure tube 7 where a portion of feed solution 100 permeates a membrane filter element 15, which portion then exits pressure tube 7 to a holding tank or process stream 25 via a permeate pipe 16. The portion of feed solution 100 that permeates element 15 is permeate 101. The portion of feed solution 100 that does not pass through membrane filter element 15 is a concentrate (or brine solution) 102. Concentrate 102 that exits pressure tube 7 is directed to a holding tank or via concentrate pipe 26 back to feed tank 2 to be recycled back through filter 15.

Preferably, pump suction pipe 4 contains a shut off valve 5 that can be used to isolate pump 6 for maintenance purposes. During normal operation, the pressurized feed solution from feed pump 6 is pumped to element pressure tube 7 through a feed diverter valve 14. The flow rate to pressure tube 7 can be controlled with a feed valve 8 and a concentrate valve 9. A feed pressure gauge 12 along feed pipe 13 is used to measure the feed pressure from pump 6.

Concentrate 102 is removed from the top of element pressure tube 7. Along concentrate pipe 26, concentrate 102 passes through a concentrate diverter valve 19, concentrate valve 9, and a concentrate flow meter 10. Concentrate flow meter 10 is used to measure the concentrate flow from pressure tube 7 via concentrate pipe 26.

Permeate 101 can be removed from either the top or the bottom of pressure tube 7. Along permeate pipe 16, permeate 101 passes through a permeate accumulator 17, a permeate diverter valve 18, and a permeate flow meter 11. Permeate flow meter 11 is used to measure the permeate flow from pressure tube 7 via permeate pipe 16.

During a back-flush cycle, gas is released from compressed gas tank 20 as a back-flush fluid via both a pipe 21 and permeate pipe 16 to enter pressure tube 7. Upon exiting gas tank 20, the gas passes through a gas regulator 22, pipe 21, through permeate diverter valve 18, permeate pipe 16, permeate accumulator 17, into pressure tube 7, and eventually into a concentrate blow down line 23. The pressure on the back-flush gas in this embodiment needs to be greater than the feed pressure on element 15 by about 10–30 psi, which in this embodiment is controlled by gas regulator 22. The back flush pressure range is 5 to 100 psi. Preferably, the range is between 20 and 60 psi.

Optionally, during the back-flush cycle, permeate 101 (or another back flush fluid such as compressed fluid, compressed nitrogen, compressed air and/or cleaning solution) can be redirected via feed diverter valve 14 and concentrate diverter valve 19 into the top of the pressure tube 7, out the bottom thereof, and into concentrate blow down line 23. Concentrate blow down line 23 could be directed into a waste holding tank or to a drain 24. The purpose of changing the flow from a bottom up to a top down configuration is to aid in removing suspended particles which have built up on the surface of membrane filter element 15 in pressure tube 7.

Figure 2:
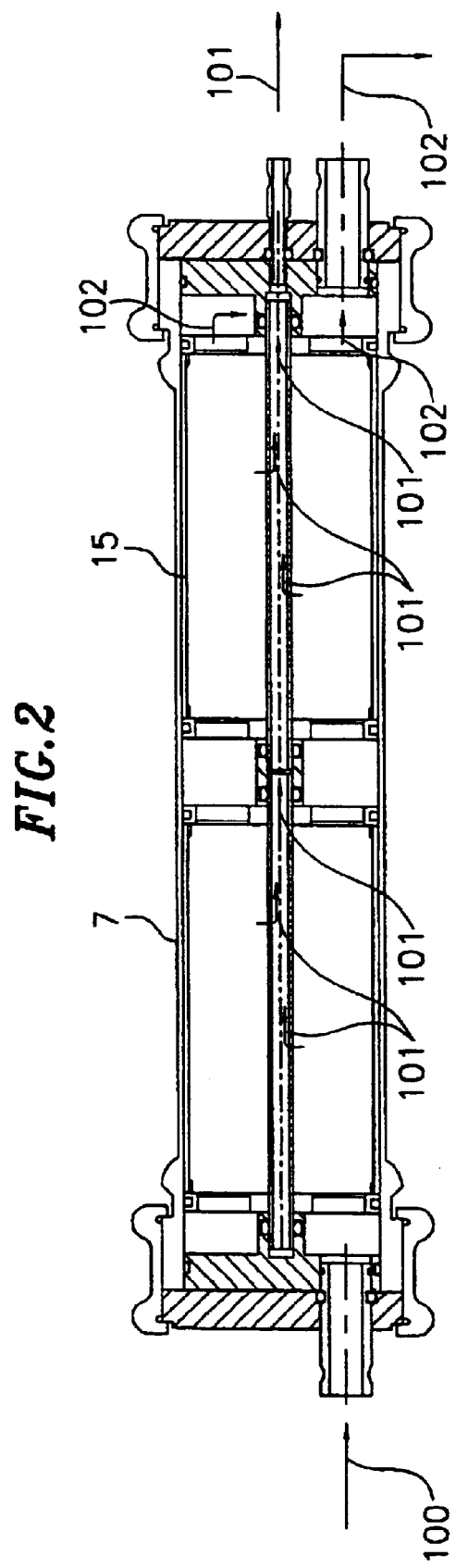
FIG. 2 shows a cross-sectional view of multiple filters in an element pressure tube.

In a practical system design, several filters would be placed in series such that concentrate 102 from a first filter would become the feed to a next filter (See FIG. 2). In FIG. 2, one element with two filters is shown, but the element can optionally accommodate more than 2 filters.

A back-flush fluid can be a liquid or gas or a combination of both, including air, nitrogen, helium, other non-hazardous gasses, water, detergent, and cleaning solutions. The back-flush fluid is used to reverse the permeate flow. Back-flush gas can be supplied by means of a compressor. Using the combination of a liquid and a gas back-flush, has a beneficial effect on the cleaning action of the back-flush cycle In this first embodiment, the combination is utilized, such that the permeate and nitrogen are used to drive permeate back-flush system 1. The gas released from compressed gas tank 20 pushes permeate 101 from permeate accumulator 17 back into element 15. Accumulator 17 retains a certain volume of permeate 101 which is used as the initial back-flush fluid, which is replaced by the nitrogen back-flush fluid when depleted.

Figure 3:
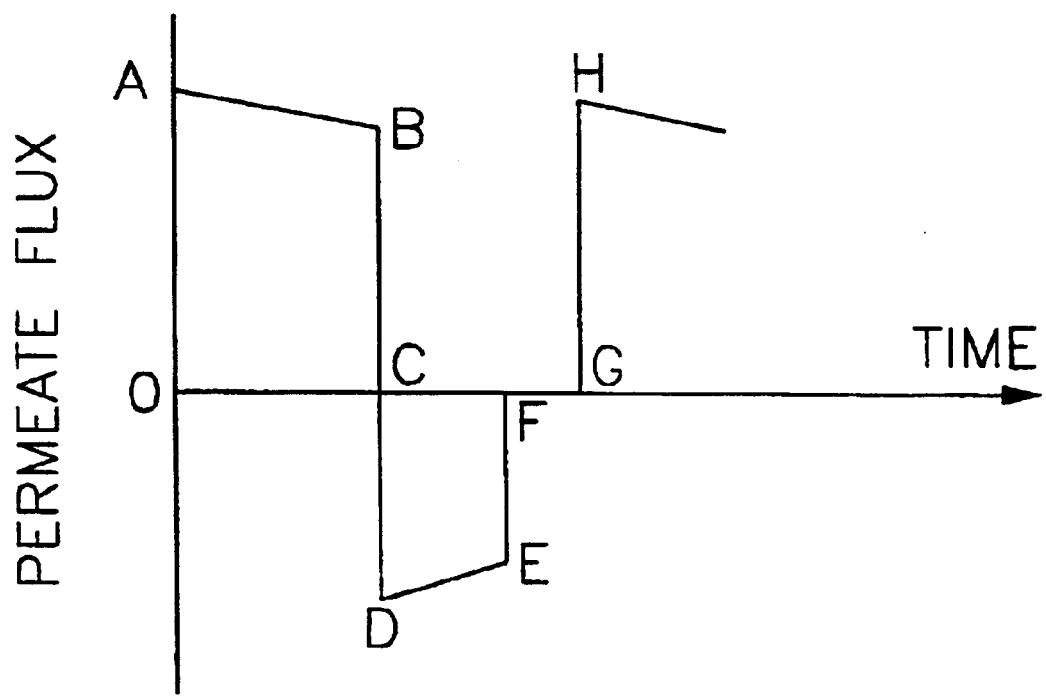
FIG. 3 shows the relationship of permeate flux versus time operating sequence for a back-flushed element system according to one embodiment of the invention.

FIG. 3 is a diagram illustrating the permeate flux of a membrane filter layer sheet 71 versus time. The initial permeate flux would start at a value A, and decrease with time due to membrane fouling to value B. After this operating cycle, the back-flush cycle would decrease the permeate flux very quickly to zero as indicated by value C, and then the back-flush cycle reverses the permeate flow to value D The back-flush continues for a specified time period to value E when foulants have been removed from membrane filter layer sheet 71. Then, the back-flush pressure would be stopped which would again decrease the permeate flux to zero as indicated by value F. After a time, indicated by value G, the system would then be started up in the normal forward operation as indicated by value HI and the cycle would continue. More permeate is created than is needed to back flush the system.

The normal feed configuration would occur for a set period of time that is dependent on the feed supply, turbidity of the water, membrane type and flux, and other variables associated with the membrane systems. After this time period has elapsed, the back-flush cycle would be started which would run for a much shorter time period. The back flush cycle occurs at predetermined intervals that are dependent on the membrane filter layer sheet 71, element 15, feed solution 100, and operating conditions. The duration of the back-flush cycle is normally 1 to 30 seconds. To optimize the permeate output from element 15, the back-flush part of the cycle has a cycle duration of between 1 and 30 seconds, but preferably has a 5 to 15 second duration.

Figure 4:
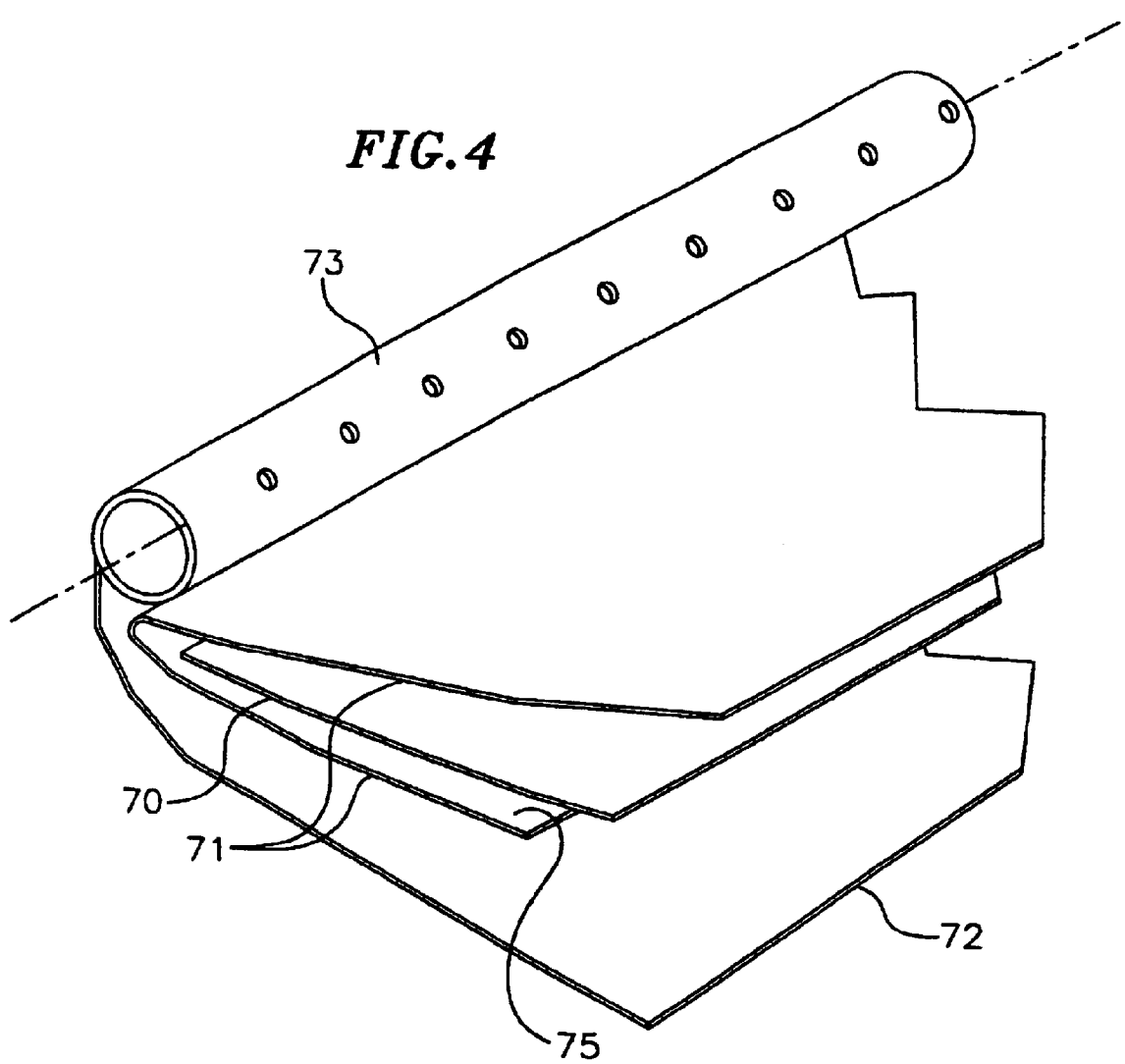
FIG. 4 shows a perspective view of how a membrane filter layer sheet, a permeate carrier fabric sheet, and a feed spacer sheet are arranged around a permeate collection tube.

In the preferred embodiment shown in FIG. 4, the spiral wound membrane filter element 15 capable of being back-flushed comprises a minimum of three layers: a membrane filter layer sheet 71, a feed spacer sheet 70, and a permeate carrier fabric sheet 72. Membrane filter layer sheet 71 may be homogenous or asymmetric. For a homogenous membrane filter layer sheet, polymeric film may be encased around a support substrate (support fabric) or be a self-supporting polymeric film. In an asymmetric membrane filter layer sheet, the polymer film is cast on top of a support substrate. Preferably, each membrane filter layer sheet has a support substrate (support fabric) and a polymeric membrane film. The support substrate has a low resistance to fluid flow but imparts sufficient mechanical strength to the polymeric membrane film such that the polymeric membrane film does not delaminate from the substrate during the back-flushing cycle. The methods of making the membrane filter layer sheet that remains laminated during back-flushing are discussed in detail with reference to FIG. 5.

Membrane filter layer sheet 71 is normally folded in half over a feed spacer sheet 70. An active membrane film side 75 of membrane filter layer sheet 71 faces both sides of feed spacer sheet 70. The third layer is permeate carrier fabric sheet 72 which acts as a conduit that allows that part of the feed solution which permeates the membrane filter layer sheet to exit the membrane filter element via a permeate collection tube 73 which is in the center of element 15. Each membrane filter layer sheet 71 is bonded to permeate carrier fabric sheet 72 with an adhesive capable of retaining the seal throughout back-flushing of the element The seal between the membrane filter layer sheet and the permeate carrier fabric sheet is made on the three sides that are not adjacent to permeate collection tube 73, such that a center side part of permeate carrier sheet 72 corresponds with permeate collection tube 73. The layers are then wrapped up around permeate collection tube 73 to form the spiral wound element.

When all three layers are rolled up, each permeate carrier fabric sheet 72 is sandwiched between the back of membrane filter layer sheet 71 to form an envelope for the permeated water. The feed spacer sheet can have a thickness in the range of 0.02" to 0.10," but preferably is 0.04" to 0.06" thick. The feed spacer sheet is sandwiched by membrane filter layer sheet 71 with the active membrane film side 75 facing both sides of feed spacer sheet 70. The adhesive seal that is placed around permeate carrier fabric sheet 72 allows the permeated water to flow into permeate collection tube 73 while preventing the feed solution from entering permeate carrier fabric sheet 72 without first permeating active membrane film side 75 of membrane filter layer sheet 71. The feed spacer sheet is held in place by friction. The layers are wrapped so tightly around the collection tube that the feed spacer sheet is not able to move.

To back flush the element, permeate that has collected in permeate accumulator 17 and/or the gas from tank 20 is pushed back through permeate collection tube 73 and into the filter layers of element 15. The back-flush fluid is forced into permeate carrier fabric sheet 72. Back-flush fluid then moves back through membrane film side 75 of membrane filter layer sheet 71 to dislodge any sticking particles. The fluid then travels through feed spacer sheet 70 and out the bottom of pressure tube 7.

The driving pressure for these operations, which is normally present as a pressurized feed solution 100 but could also be applied as a vacuum on permeate steam 101, must overcome the pressure drop through feed spacer sheet 70, and in addition, once a portion of feed solution 100 permeates the membrane filter layer sheet, it also must overcome the pressure drop through permeate carrier fabric sheet 72. Element 15 shown in FIG. 4 is the simplest element configuration. To create elements with larger capacities, multiple leaves must be used to minimize the pressure drop of permeate solution 101 through permeate carrier fabric sheet 72.

Besides delamination of membrane film 75 from support substrate 76, another area where the spiral wound elements of the prior art would fail when exposed to back-flush pressures, is at the membrane adhesive seal This problem is especially true when trying to bond the permeate carrier fabric sheet to wet membrane filter layer sheets, because it is difficult for most polyurethane adhesives to penetrate into a saturated substrate without the isocyante functional group reacting with the water. It is important to note that the feed pressure is actually compressing the adhesive seal in normal operation and thus there is normally not a requirement for the adhesive seal to have good peel strength, only that it not allow any feed solution to bypass into the permeate collection tube.

To obviate the problem of lack of adhesion during back-flushing operation of spiral wound element filters, an adhesive has been manufactured by E. V. Roberts of Culver City, Calif., model number 1752. The adhesive was custom formulated to our performance specifications. The adhesive is such that, during the back flush cycle where the seals are tensioned rather than compressed, membrane filter layer sheets 71 remain sealed to permeate carrier fabric sheet 72. This adhesive gives superior penetration and peel strength, even when membrane filter layer sheet 71 is in a wet condition, such that delamination under back-flush conditions is prevented.

The characteristics of the adhesive include being a two-pant polyurethane adhesive, being thixotropic, having a high viscosity, having good penetration into the support substrate, not being too sensitive to moisture (in that it can be applied to wet membrane filter layer sheets and still retain it's bonding properties), and being thick enough to coat the permeate carrier fabric sheet so as not to leave gaps. The specifications of the adhesive vary depending on whether the finished membrane layer sheet is dry or wet. For example, urethanes are very reactive with water. The reaction with the urethanes will form a gas thereby leaving voids in the adhesive line. Using different isocyanate groups for wet membrane layer sheets will not form this gas.

Generally, the preferred two-part polyurethane adhesive includes an "A" component and a "B" component that are shipped in separate containers. When the components are mixed together in the proper ratios, these "two-parts" react with each other forming a cross-linked adhesive that gels in about an hour and obtains working strength in about 6 to 8 hours. In an exemplary embodiment, the adhesive is mixed in a ratio of 100 parts by weight of "A" to 173 parts by weight of "B". The work life at 25° C. is about 30 to 35 minutes. The mixed viscosity of the adhesive at 25° C. is about 50,000 cps. Preferably, after 254 hours of cure, the adhesive has a Shore A hardness of between 75 and 85 and an overlap shear strength on aluminum of between 800 and 1200, preferably at least 1000 psi, and an overlap shear strength on PVC of between 300 and 500, preferably at least 400 psi. These properties ensure that the adhesive retains the bond during back flushing.

The method of making the back-flushable spiral wound membrane element comprises the steps of forming the membrane filter layer sheet, cutting the membrane filter layer sheet to the desired length and placing a cut piece of the feed spacer sheet on top of the membrane filter layer sheet and to one side thereof. The width of the feed spacer sheet is approximately half the width of the membrane filter layer sheet The membrane filter layer sheet is folded over the feed spacer so that the feed spacer sheet is sandwiched between two layers of the membrane filter layer sheet. The permeate carrier fabric sheet is then attached to the permeate collection tube via a double sided tape or other suitable means, and an adhesive seal is applied on the permeate carrier fabric at end farthest from the permeate collection tube and at the two sides thereof. The membrane filter layer sheet-feed spacer sheet sandwich is then positioned over the permeate carrier fabric sheet such that the adhesive seal bonds the membrane filter layer sheet to the permeate carrier fabric sheet. The layers are then wound around the permeate collection tube to form spiral wound membrane filtration element 15.

There are several ways to create the membrane filter layer sheet having membrane film 75 and support substrate 76. See FIG. 5. Polymers that are used to create the membrane film may be dissolved in solvents or applied as melted-homogenous films. The most common method for making the membrane filter layer sheet involves coating a polymer dissolved in a suitable solvent, such as dimethylformamide, 1,4 dioxane, acetone, or n-methyl pyrolidone, onto a support substrate.

Figure 5:
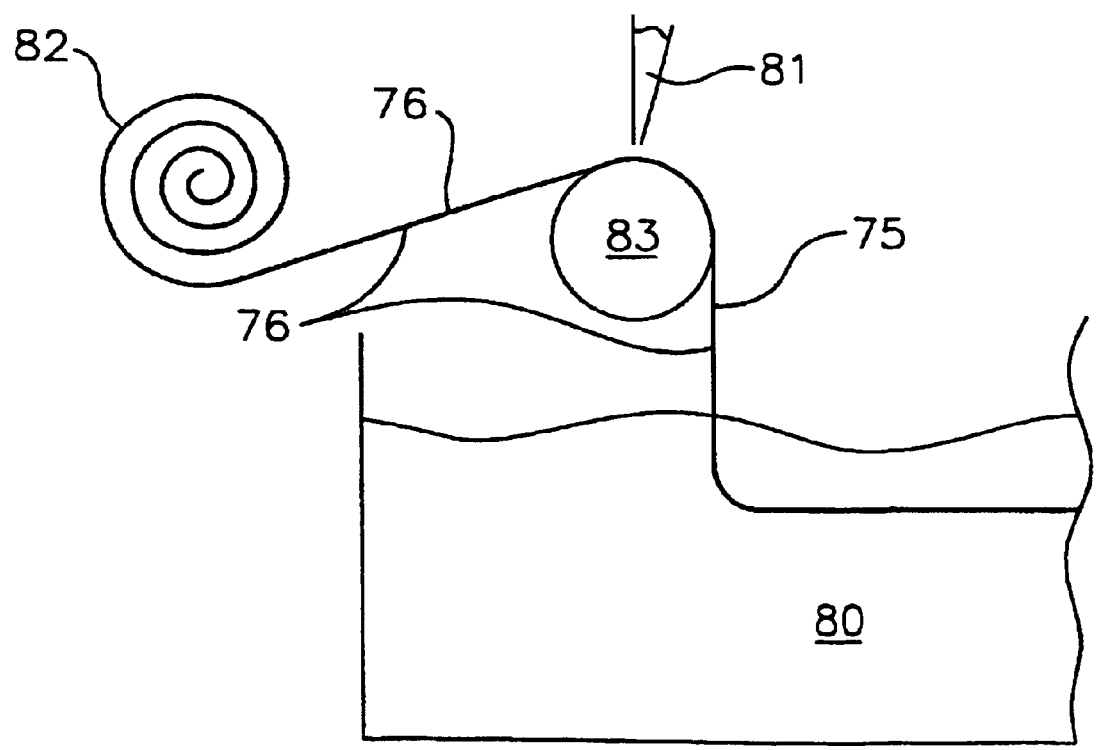
FIG. 5 shows a side view of a process system wherein the membrane film is cast onto a support substrate.

Membrane filter layer sheets that can withstand repeated cycles of back flushing must be created for either homogenous, or asymmetric designs. If the membrane film is cast where the support substrate is encased in the polymer matrix (homogeneous), a membrane filter layer sheet with excellent resistance to back-flushing is created. In the preferred embodiment, the membrane film is cast on top of the support substrate to form an asymmetric membrane filter layer sheet. For the asymmetric sheet, a sufficient bond must be created between the membrane film and the support substrate. FIG. 5 illustrates the process system wherein the membrane film is cast onto the support substrate as in the homogeneous or asymmetric membrane filter layer sheet. The homogeneous membrane filter layer sheet has a greater strength than the asymmetric sheet because the support substrate is encased in the polymer matrix, rather than polymer cast on top of the substrate. However, the processes in which homogeneous membrane filter layer sheets are used are limited. For example, the homogeneous membrane filter layer sheets function optimally with microfiltration and ultrafiltration processes.

A homogenous membrane is formed by coating a polymeric casting solution onto a support substrate, whereby the porosity of the support and the penetration of the casting solution allows the casting solution to completely penetrate the support fabric, thereby encapsulating the support fabric inside the membrane polymer. The coated membrane film is then allowed an amount of time to form a skin, before quenching the film in a fluid bath, preferably water. The initial solvent on the outside of the sheet is rapidly removed upon insertion into the bath. Leaving the sheet in the quench bath for a time allows the remainder of the solvent, that has not diffused out of the membrane, to be removed from the membrane layer sheet. Because of the chemistry of the casting solution, and the formation of the membrane skin, the finished membrane has a surface layer with small and uniform pores. This structure is homogeneous throughout the membrane structure, thus creating a higher resistance to fluid flow and requiring a greater pressure drop than a corresponding asymmetric membrane. Upon examination of this membrane layer sheet under a scanning electron microscope (SEM), it can be seen that the pore size at the membrane surface is small and uniform, and this structure is fairly uniform throughout the membrane cross section. This symmetry, or homogeneity, is where these membranes derive their name of homogenous membranes. The porosity of the support substrate is between 0.1 and 3 cfm/ft$^2$, preferably between 0.5 and 1 cfm/ft$^2$, with a thickness of between 0.001" and 0.005", preferably between 0.002" and 0.004", and a weight between 20 and 100 gm/yd$^2$, preferably between 40 and 80 gm/yd$^2$. The chemistry alnd physical properties of the casting solution are also important. The viscosity of the casting solution is between 50 and 300 centipoise (cps), preferably between 100 and 200 cps, and is controlled by controlling the molecular weight of the polymer, the percentage of polymer dissolved in the solvent (between 7% and 18%, depending on the polymer used) and the casting solution temperature (between 0° C. and 70° C., preferably between 15° C. and 40° C.). To allow for complete penetration of the casting solution into the support fabric, the casting solution is applied at a rate between 3 and 30 fpm, preferably between 3 and 8 fpm, and with an air quench time between 5 and 60 seconds, preferably between 20 and 30 seconds. The advantage of homogenous membranes is that they are very resistant to back flushing due to the encapsulated design. They are more difficult to manufacture, due to the fact that an external support mechanism must be designed into the casting machine (FIG. 5) to support the penetrated support substrate and transport the membrane to the quench tank. This can be accomplished by rotating a casting drum 83 or supporting the membrane on a continuous and porous conveyor. This is required because the penetrating casting solution will not allow the membrane to be pulled over a stationary drum prior to quenching.

An asymmetric membrane is formed by coating a polymeric casting solution onto a support substrate, whereby the porosity of the support and the penetration of the casting solution allows the casting solution to penetrate the surface of the support fabric but does not allow the casting solution to penetrate or bleed through the back of the support substrate. The coated membrane film is then allowed an amount of time to form a skin, and then is quenched in a fluid bath, preferably water, which allows the remainder of the solvent to be removed from the membrane layer sheet. Because of the chemistry of the casting solution, and the formation of the membrane skin, the finished membrane has a very dense surface layer with very small and uniform pores, while the inner layer that supports the surface membrane is much more porous or spongy. Due to the inner layer's high porosity, there is very little resistance to fluid flow, and only a minimum amount of pressure drop is created for flow of permeate through the membrane, making the asymmetric design preferable over the homogeneous design. Upon examination of this membrane layer sheet under a scanning electron microscope (SEM), it can be seen that the pore size at the membrane surface is very small and uniform, while the polymeric membrane underneath this thin surface layer has very large pores that resemble a spongy material. This lack of symmetry, or asymmetry, is where these membranes derive their name of asymmetric membranes. The porosity of the support substrate is between 1 and 10 cfm/ft$^2$, preferably between 1.5 and 3 cfm/ft$^2$, with a thickness between 0.002" and 0.008", preferably between 0.003" and 0.005", and a weight between 20 and 100 gm/yd$^2$, preferably between 70 and 90 gm/yd$^2$. The chemistry and physical properties of the casting solution are also important. The viscosity of the casting solution is between 100 and 1000 centipoise (cps), preferably between 250 and 350 cps, and is controlled by controlling the molecular weight of the polymer, the percentage of polymer dissolved in the solvent (15%–25% depending on the polymer used), and the casting solution temperature (between 0° C. and 70° C., preferably between 15° C. and 40° C.). To allow for some penetration of the casting solution into the support fabric, but to prevent bleed through, the casting solution is applied at a rate of between 5 and 50 fpm, preferably between 5 and 10 fpm, and with an air quench time between 5 and 60 seconds, preferably between 20 and 30 seconds. For most traditional applications, the asymmetric membranes are produced to have very uniform surface pores and adhesion of the membrane to the support substrate is of secondary concern. In the present invention the adhesion is created through the selection of polymers, both the fabric and the membrane, that create good chemical bonding, and allowing penetration of the polymer into the fabric support matrix to create additional mechanical interlocks to further aid in preventing delamination during the backflush cycle.

The process shown in FIG. 5 will now be described. A roll of substrate 82 is unwound and treated with polymeric casting solution 81. The thickness of the membrane film is controlled through the use of a mechanical device, either a doctor blade or a precision slot coater, through which the polymer-solvent casting solution 81 is applied as shown in FIG. 5. To effect a sufficient bond, it is preferable to allow between 5 and 60 seconds of air quench time (air contact of solution 81 while on the support substrate) prior to immersion in a quench bath 80. Preferably, the air quench time is between 20 and 30 seconds. The polymer-solvent-support substrate matrix is first quenched in air to allow the formation of a thin skin, and then quenched in a suitable fluid 80, preferably water, to allow removal of solvent in solution 81, thus producing a permeable membrane film. Once the solvent has been extracted from the membrane film, the membrane film may be further treated through heat or additional rinsing, drying, or additional coating, to obtain the final desired filtration properties. In the case of composite membranes, a secondary coating may also be applied on top to the membrane film to achieve nanofiltration or reverse osmosis type membranes.

Preferably, the capability of back-flushing is accomplished using a membrane film made from polymers such as polyethylene, polypropylene, or polysulfone. However, membrane films which may be employed include polyamides, polyphenylene esters, polyethersulfone, polysulfonamides, polyvinylidene fluoride, cellulose acetate, cellulose, polyacrylonitrile, or other film forming polymers.

Preferably, the support substrate 76 comprises a non-woven fabric. The support substrate characteristics vary depending on how whether the membrane film is cast on top of the support substrate or encased within the polymer matrix. For homogenous membrane filter layer sheets, a support substrate with a thickness of 0.001"–0.005", but preferably 0.002"–0.004" thick, has a Frazier air permeability of 1 to 10 cubic feet per minute per square foot ($cfm/ft^2$), preferably 1.5 to 3.0 $cfm/ft^2$, and a weight from 20–100 grams per square yard ($gm/yd$).$^2$ For asymmetric membrane filter layer sheets, a support substrate with a thickness of 0.002"–0.008", but preferably 0.003"–0.005" thick, has a Frazier air permeability of 1.0 to 10.0 $cfm/ft^2$, preferably 1.5 to 3.0 $cfm/ft^2$, and a weight from 20–100 $gm/yd^2$.

To further improve the penetration of the casting solution into the support substrate 76, the casting solution is applied at an elevated temperature in the range of 0° C. to 70° C., but preferably between 15° C. and 40° C. For proper adhesion of membrane film 75 to support substrate 76, the viscosity of the casting solution must be in the range of 100 to 1000 centipoise (cps), but preferably between 250–350 cps.

Several improved chemical mechanical, and process conditions have been developed to achieve good mechanical and chemical bonding between membrane film 75 and support substrate 76. The high back pressures in back-flushing are essential to allow sufficient back flow of fluids to enable and assure membrane cleaning effectiveness. A combination of membrane polymer casting solution conditions and support substrate 76 properties result in a strongly bonded composite, sufficient to resist delamination under such high back pressures. Typically, ultrafiltration membranes have an air quench time of 1–2 seconds to minimize bleed through of the casting solution through the support substrate. In the present invention, the air quench time is between 5 and 60 seconds, but preferably between 20 and 30 seconds. If the time is too long, membrane film 75 will bleed through. The combination of a porous support substrate 76 that is not too highly calendered, a heated and relatively low viscosity casting solution, and an increased air quench time, creates an ultrafiltration membrane film 75 with sufficient mechanical and chemical bonding to the support substrate 76 to allow thousands of back-flush cycles at up to 100 psi without adversely affecting the membrane film transport properties. In the present invention, membrane filter layer sheet 71 is capable of withstanding back pressures of up to 100 psi without delamination of membrane film 75 from support substrate 76, while maintaining the adhesive seal, and with no other adverse affects on membrane filter layer sheet 71 or element 15 performance properties.

Figure 6:
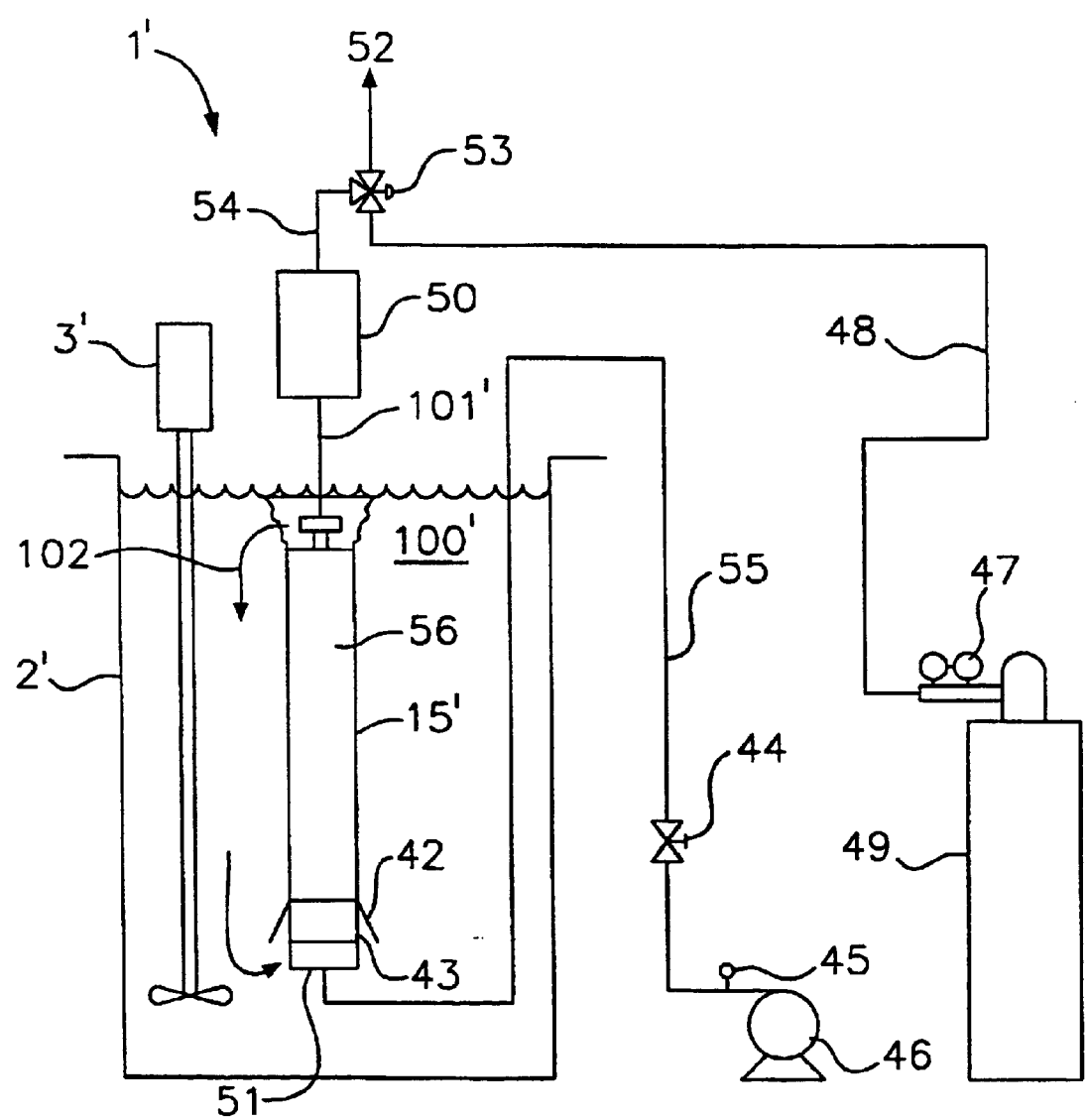
FIG. 6 shows another embodiment of the back-flush system using an element submersed vertically in a tank with a vacuum being applied as the driving force to remove permeate.

A second preferred embodiment of the present invention is shown in FIG. 6. A spiral element back-flush system $1^1$ has a feed tank $2^1$, an air pump 46, an element $15^1$, a vacuum system 52 and a compressed gas tank 49. Element $15^1$ is preferably mounted in a vertical position. Feed tank $2^1$ contains a feed solution $100^1$ that is kept well mixed via a mechanical stirrer $3^1$. The driving pressure to force feed solution $100^1$ into element $15^1$ is via vacuum system 52. Air pump 46 is used to promote turbulence at the surface of membrane filter layer sheets 71. Tank 49 uses compressed gas to back flush element $15^1$.

Pump 46 compresses gas, preferably air, through a feed pipe 55, a feed pressure control valve 44 and, eventually, into bubbler 51. A pressure gauge 45 along pipe 55 is used to measure the pressure from pump 46. Bubbler 51 creates a uniform distribution of fine bubbles 43 which are directed via a collector 42 into the bottom of membrane filter element 15. Bubbles 43 act as turbulence promoters at the surface of membrane filter layer sheet 71 (see FIG. 6) and help reduce the boundary layer thickness at the surface of membrane filter layer sheet 71. Bubbles 43 also create a convective flow of feed solution 100 from the bottom through the top of element $15^1$, and back to the bottom again.

During normal operation, vacuum 52 is applied to permeate collection tube 56 through a first permeate diverter valve 53 and via a permeate pipe 54 to element $15^1$. Permeate pipe 54 preferably includes a permeate accumulator 50. Vacuum system 52 creates a driving pressure across membrane filter layer sheet 71 resulting in production of a permeate $101^1$. Vacuum system 52 can be created by a vacuum pump, the suction side of a centrifugal pump, or an aspirator. The vacuum is preferably in the range of 5 to 29 mm Hg.

In this embodiment, the portion of feed solution $100^1$ that permeates element $15^1$ is permeate $101^1$. Permeate $101^1$ passes through permeate accumulator 50, a first permeate diverter valve 53, and then, through vacuum system 52. Concentrate $102^1$ is defined as the portion of feed solution $100^1$ that does not pass through membrane filter element $15^1$ and remains in feed tank $2^1$ to be recycled back through filter $15^1$.

As shown in FIG. 6, the back-flush fluid is a combination of nitrogen gas from tank 49 and permeate $101^1$. The back-flush fluid may be air, nitrogen, or some other suitable gas, alone or in combination with the permeate fluid. System $1^1$ can also be designed to utilize only the permeate in the back-flush step. This preferred embodiment has the benefits of not requiring a pressure tube for element $15^1$, uses an air pump to circulate feed solution $100^1$ instead of a pump, and may result in lower membrane fouling due to the low feed pressure and the turbulence created by air bubbles 43.

During the back-flush cycle, the permeate diverter valve 53 is activated allowing the back-flush fluid to enter permeate collection tube 56. Nitrogen, from compressed gas tank 49, is fed through a pressure regulator 47. After passing through pressure regulator 47, nitrogen moves through a gas pipe 48, permeate diverter valve 53, and into the permeate pipe 54. Preferably, the initial back-Bush fluid would be permeate $101^1$ stored in accumulator 50, followed by the nitrogen gas. The use of nitrogen gas as back flush fluid results in increased turbulence on the surface of membrane filter layer sheet 71, further aiding in the removal of foulants. After a set period of time, permeate diverter valve 53 is again activated and system $1^1$ returns to normal operation. This process of creating permeate $101^1$ through vacuum system 52 and periodic back-flushing is repeated on a regular basis to maintain a steady state flux rate through membrane filter element $15^1$.

The following examples serve to further illustrate the invention, but should not be construed as in any way limiting the broader aspects thereof.

EXAMPLE 1

An ultrafiltration membrane film was cast on a support substrate that was porous enough to allow good penetration of the casting solution into the support substrate structure to insure a good mechanical bond, but not too porous as to allow excessive bleed through of the casting solution. The substrate polymer also had to have good chemical affinity for the membrane casting solution. Although there may be other substrates that could perform this function, we obtained excellent results with a dry lay polyester non-woven substrate, with a weight of 80 grams per square yard, 0.004" thick, and a Frazier air permeability of 1.5 to 3 cubic feet per minute per square foot (cfm/ft$^2$). The Frazier air permeability is a measure of the porosity of the substrate. These substrates are produced using short polyester fibers that are "carded" into felts that are relatively thick, and then are "calendered" between a steel and felt roll under high pressure and temperature to obtain the proper porosity, thickness, and weight. Many substrates used in these applications are highly "calendered" resulting in a support substrate having a paper-like finish. While this type of a finish gives a uniform coating surface with few defects and small pores, the dense, paper like fins makes it difficult for the casting solution to penetrate, and as a result, the membrane film is easily delaminated.

In this example, we cast an ultrafiltration membrane film using a 18% BASF polyethersulfone polymer dissolved in 23% DMF and 55% NMP, to give a mixed viscosity of 320 centipoise. This formulation gave good penetration and adhesion to the support substrate, and was coated at a thickness of 0.0028".

To further improve the penetration of the casting solution into the support substrate, the casting solution was applied at an elevated temperature of 30° C. The casting solution was then allowed an air quench time of 26 seconds prior to immersion in the solvent extraction bath which was chilled to 10° C. The membrane filter layer sheet was cast at 8 feet per minute (fpm). The membrane filter layer sheet was then fed into a heat treat tank filled with 65° C. water to anneal and heat set the membrane filter layer sheet. The membrane filter layer sheet was tested under 30 psi of pressure with 500 ppm of a 76,000 MW dextran solution. The membrane filter layer sheet exhibited a flux of 30 GFD at 97% rejection.

This membrane filter layer sheet was then wound into two spiral elements with a 2.5" diameter and a length of 14" long using the custom formulated adhesive.

The element was then placed in a FRP pressure tube tested with a solution of DI water and a mixture of hexamethylene tetramine and hydrazine sulfate. This mixture forms uniform and well distributed suspended particles in the 1–5 micron range and is used as a standard for turbidity measurements. The feed turbidity was maintained between 50 and 100 NTU. This feed solution was pressurized with a feed pump to 30 psi and fed to the two 2514 elements. The elements exhibited a combined permeate flow of 1.2 liters per minute and produced a permeate turbidity of 0.1 NTU's. The permeate turbidity was used as an indicator of membrane integrity. If the membrane integrity was compromised during the back-flush cycles, the permeate turbidity would increase. The element was then run on standard tap water at 30 psi during the feed. Every 30 seconds, the element was back-flushed with nitrogen at 15 psi for 15 seconds. This cycle was repeated for 2030 cycles. The element was then retested with the hexamethylene tetramine and hydrazine sulfate turbidity standard and exhibited a combined permeate flow of 1.1 lpm and a permeate turbidity of 0.1 NTU's. This test indicates that the membrane filter layer sheet and element maintained their integrity during this test and did not delaminate.

EXAMPLE 2

A microfiltration membrane film was cast on a support substrate as in Example 1. However, in this example, a BASF polyvinylidene fluoride polymer was dissolved in 80% DMF, to give a mixed viscosity of 350 centipoise. This formulation gave good penetration and adhesion to the support substrate.

To further improve the penetration of the casting solution into the support substrate, the casting solution was applied at an elevated temperature of 30° C. The casting solution was then allowed an air quench time of 20 seconds prior to immersion in the solvent extraction bath. The membrane filter layer sheet was tested under 10 psi of pressure with 500 ppm of hexamethylene tetramine and hydrazine sulfate turbidity standard. The membrane filter layer sheet exhibited a flux of 35 GFD at 10 psi and the permeate produced had a turbidity of <0.1 NTU.

This membrane filter layer sheet was then wound into two spiral elements with a 2.5" diameter and a length of 14" long using the E. V. Roberts 1752 adhesive. The element was then placed in a FRP pressure tube tested with a solution of hexamethylene tetramine and hydrazine sulfate turbidity standard at 30 psi. The element exhibited a flux of 35 GFD and a permeate turbidity of 0.2 NTU. The element was then run on standard tap water at 10 psi in a back-flush cycle. Every 30 seconds, the element was back-flushed with nitrogen at 30 psi for 15 seconds. This cycle was repeated for 1236 cycles. The element was then retested with the hexamethylene tetramine and hydrazine sulfate turbidity standard at 10 psi and exhibited 34 GFD and a permeate turbidity of <0.1 NTU. This example indicates that the membrane filter layer sheet and element maintained their integrity during this test and did not delaminate.

EXAMPLE 3

The test of Example 1 was repeated using the same element but with an increase back-flush pressure of 30 psi. The element was then placed in a FRP pressure tube tested with a solution of DI water and a mixture of hexamethylene tetramine and hydrazine sulfate. The feed turbidity was maintained between 50 and 100 NTU. The elements exhibited a combined permeate flow of 1.4 liters per minute and produced a permeate turbidity of 0.1 NTU's. This cycle was repeated for 1400 cycles. The element was then retested with the hexamethylene tetramine and hydrazine sulfate turbidity standard and exhibited a combined permeate flow of 1.5 lpm and a permeate turbidity of 0.2 NTU's. This test indicates that the membrane filter layer sheet and element maintained their integrity during this test and did not delaminate.

EXAMPLE 4

The test of Example 1 was repeated using the same element but with an increased back-flush pressure of 45 psi. The element was then placed in a FRP pressure tube tested with a solution of DI water and a mixture of hexamethylene tetramine and hydrazine sulfate. The feed turbidity was maintained between 50 and 100 NTU. The elements exhibited a combined permeate flow of 1.7 liters per minute and produced a permeate turbidity of 0.5 NTU's. This cycle was repeated for 1000 cycles. The element was then retested with the hexamethylene tetramine and hydrazine sulfate turbidity standard and exhibited a combined permeate flow of 1.6 lpm and a permeate turbidity of 0.15 NTU's. This test indicates that the membrane filter layer sheet and element maintained their integrity during this test and did not delaminate.

EXAMPLE 5

The test of Example 1 was repeated using the same element but with an increased back-flush pressure of 60 psi. The element was then placed in a FRP pressure tube tested with a solution of DI water and a mixture of hexamethylene tetramine and hydrazine sulfate. The feed turbidity was maintained between 50 and 100 NTU. The elements exhibited a combined permeate flow of 1.6 liters per minute and produced a permeate turbidity of 0.1 NTU's. This cycle was repeated for 620 cycles. The element was then retested with the hexamethylene tetramine and hydrazine sulfate turbidity standard and exhibited a combined permeate flow of 1.6 lpm and a permeate turbidity of 0.10 NTU's. This test indicates that the membrane filter layer sheet and element maintained their integrity during this test and did not delaminate.

At the conclusion of the test, three small pinholes were punctured into one of the membrane filter elements to determine the sensitivity of the turbidity test. The element was retested with a solution of DI water and a mixture of hexamethylene tetramine and hydrazine sulfate with a feed turbidity of 55 NTU's and the permeate turbidity was 7.7 NTU's. This indicates that the turbidity test is a sensitive indicator of element integrity.

EXAMPLE 6

A 4" diameter by 40" long element was produced using the preferred membrane filter layer sheet and the preferred adhesive as in Example 1. The element was placed in a well stirred tank containing a mixture of 0.5% diatomaceous earth and 500 ppm dextran with a molecular weight of between 5–20 million daltons as a synthetic fouling solution, which had a turbidity above 100 NTU. The permeate collection tube was connected to a vacuum system that maintained a vacuum of 16 inches of mercury (in Hg) to provide the driving pressure for permeation of the feed solution through the membrane filter layer sheet. The element exhibited an initial flux of 13 GFD and the permeate turbidity was <0.1 NTU, indicating good mechanical integrity. Under the element, as shown in FIG. 6, air bubbles were produced using a porous sintered metal plate. Air was supplied using a low pressure air blower operating at a pressure of 2 inches of water (in $H_2O$) to circulate the feed solution across the surface of the membrane filter layer sheet and promote turbulence to minimize the boundary layer thickness. The element was operated for 30 minutes and then back-flushed with permeate for 5 seconds followed by air for 15 seconds. This operation was repeated for 14 days of operation. The element exhibited a flux of 12 GFD after the 14 days of operation. The turbidity of the permeate was <0.1 NTU indicating that the element integrity had not been compromised. The same element was then operated under the same conditions but without the back-flush cycle. After 5 days of operation, the flux had declined to 4 GFD. This example indicates that the back-flush cycle is beneficial in removing foulants from the surface of the membrane filter layer sheet

EXAMPLE 7

A 4" diameter by 40" long element was produced using the preferred membrane filter layer sheet and adhesive as in Example 1. The element was placed into a vertically mounted pressure tube with the feed solution entering the bottom of the pressure tube and the concentrate being removed from the top of the pressure tube as shown in FIG. 1. The element exhibited an initial flux of 8 GFD and the permeate turbidity was <0.1 NTU, indicating good mechanical integrity. The feed was pressurized to 15 psi during the trial. The element is operated in this mode for 30 minutes and is then back-flushed with permeate for 5 seconds followed by a back-flush of 15 seconds with nitrogen. During the back-flush the three-way valves are activated allowing the foulants that are back-flushed from the element to exit from the bottom of the pressure tube and also allowing the feed solution to enter the top of the pressure tube. This reverse feed flow allows gravity to help in removing foulants and suspended solids from the element and pressure tube during back-flush cycle. This operation was repeated for 14 days of operation. The element exhibited a flux of 7 GFD after the 14 days of operation. The turbidity of the permeate was <0.1 NTU indicating that the element integrity had not been compromised. The same element was then operated under the same conditions but without the back-flush cycle. After 4 days of operation, the flux had declined to 3 GFD. This example indicates that the back-flush cycle is beneficial in removing foulants from the surface of the membrane filter layer sheet.

The preceding description indicates the preferred embodiments of the present invention, but it is not limited to the designs shown. Therefore, the present invention is not intended to be limited to the working embodiments described above. Thus, it will be understood that within the scope of the following claims, this invention may be practiced otherwise than as specifically described.

What is claimed is:

1. A system for operating a spiral wound membrane element that includes back-flushing, which system comprises:

a feed tank holding a volume of feed solution;

a spiral wound membrane element having a permeate carrier sheet, a feed spacer sheet, and a membrane filter layer sheet, which element is aligned generally vertically within said feed tank, means confining said spiral wound membrane to a generally cylindrical configuration with said element being open to axial flow at both ends thereof;

a vacuum system in fluid connection with said permeate carrier sheet within said element for applying vacuum thereto to create driving pressure needed to cause the feed solution in the feed spacer sheet of the element to flow through the membrane sheet and thereby create liquid permeate flow in the carrier sheet and flow of feed solution upward into said element; and means for periodically applying pressurized back-flush fluid to said permeate carrier sheet to back-flush the element by creating flow from within said permeate carrier sheet through said membrane sheet and into said feed spacer sheet.

2. The system of claim 1 wherein said spiral wound element is aligned vertically within said feed tank and wherein a bubbler is disposed vertically below said element for creating bubbles which rise and promote convective flow of feed solution into the lower end of the element and out of the upper end, said bubbles acting as turbulence promoters at the surface of the membrane filter layer sheet for reducing the boundary layer at the surface of the membrane filter layer sheet.

3. The system of claim 2 further comprising:

an air pump for compressing gas for the bubbler;

a permeate accumulator connected to a permeate conduit in fluid connection with said permeate carrier sheet in said element, and a permeate diverter valve connected to an outlet from said accumulator, through which valve said vacuum system is connected.

4. The system of claim 3 wherein said back-flush fluid-applying means is designed to apply some permeate from said accumulator under pressure to said element.

5. The system of claim 4 wherein a source of compressed air is provided which is connected to said accumulator through said diverter valve to pressurize said permeate for back-flush flow of permeate and air back to said element.

6. The system of claim 2 wherein a permeate conduit is in fluid connection with said permeate carrier sheet in said element and exits through the open top of said tank.

7. The system of claim 1 wherein a bubbler is disposed vertically below the lower end of said element for creating bubbles which rise and promote convective flow of feed solution into the element and out of the upper end, to promote turbulence at the surface of the membrane filter layer sheet and reduce the boundary layer.

8. The system of claim 1 wherein said feed tank is filled with a volume of feed solution such that said element is completely submerged in said feed solution.

9. A method of operating a spiral wound membrane element which includes periodic back-flushing, which method comprises:

placing a spiral wound membrane element, having a feed spacer sheet, a membrane filter layer sheet and a permeate carrier sheet, generally vertically in a tank containing an aqueous feed solution, said element being confined to a generally cylindrical configuration and being open to inflow at a lower end and open to outflow at an upper end thereof;

creating a pressure differential between the permeate carrier sheet in said element and the feed solution within the tank so that water passes through the membrane sheet into the permeate carrier;

introducing on a periodic basis a pressurized back-flush fluid into the permeate carrier sheet of the element to cause reverse flow through said membrane sheet into said feed spacer sheet to dislodge feed solution solids being retained on the membrane filter layer sheet; and providing bubbles below the open lower end of the element which rise upward and flow through the element so as to create a convective flow of the feed solution into the open lower end of the element and out the open upper end and to promote turbulence at a surface of the membrane filters layer sheet to reduce a boundary layer at the surface of the membrane filter layer sheet, said bubbling rising flow causing feed solution within the element and permeate flowing in reverse through the membrane sheet to exit from the open upper end and carry with it dislodged solids.

10. The method of claim 9 wherein said pressure differential is provided by applying vacuum to the permeate carrier sheet, which method further comprises:

accumulating some of the aqueous permeate in a permeate accumulator through which said vacuum is being applied; and periodically pressurizing permeate in the permeate accumulator and causing it to flow back into the element and in reverse flow through the membrane sheet to back-flush the feed solution solids from the surface of the membrane filter layer sheet.

11. The method of claim 10 wherein gas pressure is applied to the permeate in the accumulator to provide the back-flush pressure and wherein, following back-flushing by the permeate in the accumulator, gas pressure alone is used to further back-flush the element.

12. The method of claim 9 wherein the pressure of the back-flush fluid applied to the element is between about 5 and 100 psi.

13. The method of claim 12 wherein the pressure of the back-flush fluid applied to element is between about 20 and 60 psi.

14. The method of claim 9 wherein said back-flush fluid includes gas and the pressure on the back-flush gas is controlled by a gas regulator so that the back-flush pressure is greater than the feed pressure on the element by between about 10 and 30 psi.

15. The method of claim 9 wherein the back-flush comprises cleaning solution in addition to permeate.

16. The method of claim 9 wherein the back-flush fluid comprises permeate followed by compressed air.

17. The method of claim 9 wherein said aqueous feed solution has a turbidity of at least about 50 NTU.

18. The method of claim 17 wherein said element is completely submerged in said feed solution.

19. A system for operating a spiral wound membrane element that includes the step of periodically back-flushing, which system comprises:

a feed tank holding a volume of feed solution;

a spiral wound membrane element having a permeate carrier sheet, a feed spacer sheet, and a membrane filter layer sheet, which element is aligned generally vertically within said feed tank, means confining said spiral wound membrane to a generally cylindrical configuration with said element being open to axial flow at both ends thereof;

means for creating a vacuum in said permeate carrier sheet within said element to create driving pressure across said membrane sheet that results in permeate flow into said permeate carrier sheet and flow of feed solution upward into said element in said feed spacer sheet; and means for periodically applying pressurized back-flush fluid to said permeate carrier sheet to back-flush the element by creating fluid flow from said permeate carrier sheet through said membrane sheet and into said feed spacer sheet.

20. The system of claim 19 wherein a bubbler is disposed vertically below said element for creating bubbles which rise and promote convective flow of feed solution into the lower end, through the element and out of the upper end, said bubbles acting as turbulence promoters at the surface of the membrane filter layer sheet for reducing the boundary layer at the surface of the membrane filter layer sheet.

21. The method of claim 19 wherein said aqueous feed solution has a turbidity of at least about 50 NTU.

22. The method of claim 21 wherein said element is completely submerged in said feed solution.

23. A system for operating a back-flushable spiral wound membrane cross flow filtration element comprising:

a spiral wound membrane cross flow filtration element;

means for supplying feed solution to the filtration element which includes a feed pump for pumping and pressurizing the feed solution and a feed pipe through which the pressurized feed solution flows to the element;

said element including a pressure tube having a first outlet through which a first portion of the feed solution which permeates the membrane exits as permeate, and a second outlet where a portion of the feed solution that does not permeate the membrane exits the element as concentrate;

a feed diverter valve for controlling flow in the feed pipe leading to the element to direct flow either to an inlet to the element or to drain;

a concentrate diverter valve for controlling flow of concentrate from second outlet of the pressure tube;

means for supplying back flushing fluid to the first outlet of the membrane filtration element to create reverse flow through the membrane; and means for adjusting the feed and concentrate diverter valves during back flushing to allow the back flush fluid to exit through the feed pipe and flow to drain, and for adjusting said concentrate diverter valve to halt the flow of concentrate out of the second outlet of the pressure tube.

24. The system of claim 23 wherein the spiral wound cross flow filtration element is oriented vertically and wherein the feed pipe enters the pressure tube at the bottom thereof so that solids removed during back flushing are assisted by gravity in existing through the bottom inlet.

25. The system of claim 24 wherein said second outlet is at the top of the pressure tube and a conduit interconnects said diverter valves and wherein said adjusting means allows fluid to be delivered through said diverter valves into the second outlet at the top to flow down through the element during back flushing.

* * * * *